3,041,317
FLUOROCARBON SULFONYL FLUORIDES

Hugh Harper Gibbs, Vienna, W. Va., and Richard Norman Griffin, Wilmington, Del., assignors to E. I. du Pont de Nemours and Company, Wilmington, Del., a corporation of Delaware
No Drawing. Filed May 2, 1960, Ser. No. 25,859
13 Claims. (Cl. 260—79.3)

The present invention relates to the preparation of novel fluorocarbon sulfonyl fluorides, and, more particularly, to the preparation of novel fluoroalkenyl sulfonyl fluorides and their polymerization to high molecular weight resins.

The polymerization of ethylenically unsaturated fluorinated hydrocarbons has been well established in the art. A number of highly useful polymeric products, such as polytetrafluoroethylene, have been developed from fluorocarbon monomers. However, practically no addition polymers derived from fluorocarbon monomers which contain functional groups are known. The present invention is directed to the formation of such products and to a method for their preparation.

It is, therefore, an object of the present invention to provide novel fluorocarbon monomers containing functional groups. It is another object of the present invention to provide novel fluorocarbon addition polymers containing functional side-chains. A further object of the present invention is to provide novel fluorocarbon monomers and polymers containing sulfonyl side-groups. Still another object of the present invention is to provide a method for the preparation of fluorocarbon monomers containing functional groups. Other objects will become apparent hereinafter.

The objects of the present invention are accomplished by the formation of fluoroalkenyl sulfonyl fluorides having the general formula $R_fCF=CFSO_2F$, where $R_f$ is a fluorine, perfluoroalkyl or an omega-hydroperfluoroalkyl radical, which can be polymerized with a fluorinated ethylene, i.e., a fluoroethylene, to result in the formation of high molecular weight sulfonyl fluoride side-chain containing polymers. The fluoroalkenyl sulfonyl fluorides are prepared by a process which comprises contacting a fluoroalkyl sulfonyl fluoride having the general formula $R_fCF_2$—$CFHSO_2F$, wherein $R_f$ is a fluorine, a perfluoroalkyl or an omega-hydroperfluoroalkyl radical with a catalyst consisting of a mixture of an alkali-metal chloride and chromium oxide at a temperature of 450 to 650° C. and recovering a fluoroalkenyl sulfonyl fluoride having the general formula $R_fCF=CFSO_2F$ wherein $R_f$ has the same meaning as above.

It was found that the novel fluoroalkenyl sulfonyl fluorides of the present invention polymerize with fluorinated ethylenes to form functional side-chain containing polymers. Suitable fluorinated ethylenes which form copolymers with fluoroalkenyl sulfonyl fluorides are vinyl fluoride, vinylidene fluoride, trifluoroethylene, chlorotrifluoroethylene and tetrafluoroethylene. The polymers of the present invention are prepared by polymerization techniques developed for nonaqueous homo- and copolymerizations of fluorinated ethylenes, particularly those employed for tetrafluoroethylene, which have been published in the literature and are thus not described herein in any great detail. Generally, the polymers of the present invention are obtained by the polymerization of a mixture of the fluorinated ethylene, such as tetrafluoroethylene, and the fluoroalkenyl sulfonyl fluoride in the presence of a free radical initiator, preferably a perfluorocarbon peroxide or an azo compound, at a temperature of 0° to 200° C., and pressures varying from atmospheric pressure to pressures of 200 and more atmospheres. The polymerization may be carried out in the presence of a fluorinated solvent if desired. Suitable fluorinated solvents are inert, liquid perfluorinated hydrocarbons, such as perfluoromethylcyclohexane, perfluorodimethylcyclobutane, perfluorooctane, perfluorobenzene, etc.

In accordance with the present invention, it was further found that fluoroalkyl sulfonyl fluorides containing a hydrogen in the α-position could be dehydrofluorinated to fluoroalkenyl sulfonyl fluorides in substantial yields and at high conversions when a catalyst is employed which is a physical mixture of chromium oxide and an alkali metal chloride, particularly potassium chloride. The use of either catalyst component alone in the process described fails to result in the formation of the desired product or gives rise to only very small and insignificant quantities of the unsaturated sulfonyl fluoride.

The formation of the fluoroalkenyl sulfonyl fluoride is generally carried out by a process which comprises passing the hydrofluoroalkyl sulfonyl fluoride in vaporized form over the catalyst bed and recovering the product from a cold trap by distillation. The temperature of the reaction zone should be between 450 and 650° C. and is preferably between 490 and 530° C. If desired, the starting material may be passed through the bed by means of an inert carrier gas, such as nitrogen or the process may be operated at reduced pressure so as to create a pressure drop. In general, the process is governed by conditions established for solid phase gas reactions.

The α-hydrofluoroalkyl sulfonyl fluorides employed in the present invention as starting materials are obtained from the reaction of fluoroolefins and sulfur trioxide resulting in the formation of the following sultone

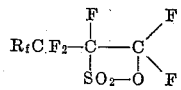

which readily rearranges and hydrolyzes on contact with water, and decarboxylates to give the desired α-hydrofluoroalkyl sulfonyl fluoride. A suitable method of preparing the hydrofluoroalkyl sulfonyl fluoride is as follows: 150 g. of the perfluoroolefin and 40 g. of freshly distilled sulfur trioxide are reacted in a 300 ml. vessel under autogenous pressure at 150° C. for 2 hours; the resulting sultone is isolated by distillation; 20 g. of the sultone is then reacted with 1.6 g. of water in a reaction zone in which the temperature is slowly increased to reflux temperatures of the reaction mixture. The hydrofluoroalkyl sulfonyl fluoride is distilled out of the refluxed mixture. Suitable starting materials are formed from such fluoroolefins as hexafluoropropylene, perfluorobutene-1, perfluoropentene-1, perfluoroheptene-1, perfluorododecene-1, omega - hydroperfluorohexene-1, omega-hydroperfluorooctene-1, and include α-hydroperfluoroethyl sulfonyl fluoride, α-hydroperfluoropropyl sulfonyl fluoride, α-hydroperfluorobutyl sulfonyl fluoride, α-hydroperfluorohexyl sulfonyl fluoride, 1,5-dihydroperfluoropentyl sulfonyl fluoride and 1,7-dihydroperfluoroheptyl sulfonyl fluoride, among others. The preferred monomers of the present invention contain from 2 to 10 carbon atoms.

The catalyst employed in the formation of the fluoroalkenyl sulfonyl fluoride comprises a physical mixture of an alkali metal chloride and chromium oxide. The catalyst is obtained by such methods as tumbling alkali metal chloride in pellet form with finely divided chromium oxide. A more homogeneous mixture of the two components is, of course, equally active. The ratio of the catalyst components is not critical. However, in general, ratios of 1:1 of alkali metal chloride to chromium oxide varying to where only trace quantities of chromium oxide are employed, are particularly suitable. Only very short contact times between 0.001 and 1 second are necessary to effect the catalytic reaction of the present invention.

The present invention is further illustrated by the following example:

A horizontal "Vycor" borosilicate glass furnace tube 15 in. long and having an O.D. of 1 in., was filled for a length of 12 in. with potassium chloride pellets admixed with 0.1 weight percent of chromium oxide. The reaction tube was placed in an electric tube furnace, heated to 506 to 509° C. and reduced in pressure to 20 to 40 mm. Hg. Through a valve, 3.6 g. of 2,2,2,1-tetrafluoroethyl sulfonyl fluoride was injected into the tube. The low pressure caused the vaporization of the liquid starting material and its passage over the hot catalyst bed. The effluent from the reaction tube was condensed in a vessel maintained at liquid nitrogen temperatures. Trifluorovinyl sulfonyl fluoride was obtained by distillation from the condensed product. The conversion of the tetrafluoroethyl sulfonyl fluoride was 51% per single pass and the trifluorovinyl sulfonyl fluoride was obtained in a yield of 61% based on recovered starting material.

The run was repeated using chromium oxide as the sole catalyst at a temperature of 500 to 513° C. and a pressure of 10 mm. Hg. A yield of less than 2% of the trifluorovinyl sulfonyl fluoride was obtained. Using potassium chloride in a 15 in. nickel tube at a temperature of 508 to 517° C. and a pressure of 25 to 35 mm. Hg, no trifluorovinyl sulfonyl fluoride was formed.

Potassium chloride was replaced by sodium chloride in the described two component catalyst and substantially identical results were obtained.

The trifluorovinyl sulfonyl fluoride isolated was found to have a boiling point at atmospheric pressure of 51.8 to 52.2° C. and a refractive index of $n_D^{25.4} = 1.32367$. Infrared scan showed absorption at 5.68 microns, indicative of the trifluorovinyl group; absorption at 6.85 and 8.25 microns, indicative of the sulfur dioxide groups; and absorption at 7.35, 8, and 9.2 microns, indicative of the carbon-fluoride bonds. Nuclear magnetic resonance was also consistent with the structure of trifluorovinyl sulfonyl fluoride.

Polymerization of trifluorovinyl sulfonyl fluoride was accomplished by the following procedure. Into a 330 ml. stainless steel pressure vessel was charged 49 ml. of perfluorodimethyl cyclobutane, 1 ml. of trifluorovinyl sulfonyl fluoride, 20 g. of tetrafluoroethylene and 0.5 g. of perfluoromethyl peroxide as the catalyst. The reaction vessel was heated to 150° C. and agitated for one hour under autogenous pressure. There was isolated from the reaction mixture 10 g. of a copolymer of tetrafluoroethylene and trifluorovinyl sulfonyl fluoride. The dried copolymer was a white powder which could be compression molded into solid shapes by preforming at room temperature and sintering the preform at 317° C. The infrared spectrum showed the presence of sulfonyl fluoride groups in the polymer.

Similar results are obtained when, instead of the tetrafluoroethyl sulfonyl fluoride, α-hydroperfluoropropyl sulfonyl fluoride, α-hydroperfluorobutyl sulfonyl fluoride, α-hydroperfluoroheptyl sulfonyl fluoride and 1,6-dihydroperfluorohexyl sulfonyl fluoride are employed in the synthesis process to result in the formation of perfluoropropenyl sulfonyl fluoride, perfluorobutenyl sulfonyl fluoride, perfluoroheptenyl sulfonyl fluoride and 6-hydroperfluorohexenyl sulfonyl fluoride; said compounds similarly form sulfonyl fluoride containing copolymers with tetrafluoroethylene when employed in the illustrated polymerization procedure. The resulting copolymers are similar to the copolymer of tetrafluoroethylene and trifluorovinyl sulfonyl fluoride, although the temperature required for sintering of the copolymer decreases as the number of carbon atoms in the comonomer increases.

It is apparent that the example illustrated merely represents one embodiment of the present invention. Various modifications and substitutions of the illustrated procedure within the frame of the invention described will occur to those skilled in the art, such modifications and equivalencies having been established in the art.

The polymers of the present invention serve many purposes. The polymers may be employed as thermoplastic resins in a manner that polytetrafluoroethylene is employed. However, a particular utility of the polymer comprises its use as an ion exchange resin after hydrolysis of the sulfonyl fluoride group to the sulfonic acid group. The chemical inertness of the fluorocarbon polymer chain makes these polymers suitable for ion exchange applications involving highly corrosive solutions.

We claim:

1. A fluoroalkenyl sulfonyl fluoride having the general formula $$R_f CF = CFSO_2F$$

wherein $R_f$ is a radical of the class consisting of fluorine, perfluoroalkyl and omega-hydroperfluoroalkyl radicals, said alkyl radicals containing from 1 to 8 carbon atoms.

2. Trifluorovinyl sulfonyl fluoride.
3. Perfluoropropenyl sulfonyl fluoride.
4. Perfluorobutenyl sulfonyl fluoride.
5. A normally solid copolymer of a fluoroethylene and a fluoroalkenyl sulfonyl fluoride having the general formula $$R_f CF = CFSO_2F$$

wherein $R_f$ is a radical selected from the class consisting of fluorine, perfluoroalkyl and omega-hydroperfluoroalkyl radicals, said alkyl radicals containing from 1 to 8 carbon atoms, said copolymer being characterized by sulfonyl groups in the infrared spectrum of the copolymer.

6. The copolymer of claim 5 wherein the fluoroethylene is tetrafluoroethylene.

7. A normally solid copolymer of tetrafluoroethylene and trifluorovinyl sulfonyl fluoride, said copolymer being characterized by sulfonyl groups in the infrared spectrum of the copolymer.

8. A process for the preparation of fluoroalkenyl sulfonyl fluoride which comprises contacting a fluoroalkyl sulfonyl fluoride having the general formula $$R_f CF_2 - CF_2H - SO_2F$$

wherein $R_f$ is a member of the class consisting of fluorine, perfluoroalkyl and omega-hydroperfluoroalkyl radicals, said alkyl radicals containing from 1 to 8 carbon atoms, with a catalyst comprising a mixture of an alkali metal chloride and a chromium oxide, at a temperature of 450 to 650° C., and recovering a fluoroalkenyl sulfonyl fluoride having the general formula $$R_f CF = CFSO_2F$$

wherein $R_f$ is as defined above.

9. The process as set forth in claim 8 wherein $R_f$ is fluorine.
10. The process as set forth in claim 8 wherein $R_f$ is perfluoromethyl.
11. The process as set forth in claim 8 wherein $R_f$ is perfluoroethyl.
12. The process as set forth in claim 8 wherein $R_f$ is 4-hydroperfluorobutyl.
13. The process as set forth in claim 8 wherein the alkali metal chloride is potassium chloride.

References Cited in the file of this patent

UNITED STATES PATENTS

| | | |
|---|---|---|
| 2,884,452 | Scherer | Apr. 28, 1959 |
| 2,950,317 | Brown | Aug. 23, 1960 |